(12) United States Patent
Derrick et al.

(10) Patent No.: US 6,321,380 B1
(45) Date of Patent: Nov. 20, 2001

(54) METHOD AND APPARATUS FOR MODIFYING INSTRUCTION OPERATIONS IN A PROCESSOR

(75) Inventors: John Edward Derrick, Round Rock; Lee Evan Eisen; Kevin Franklin Reick, both of Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/345,161

(22) Filed: Jun. 29, 1999

(51) Int. Cl.[7] ................................................. G06F 12/12
(52) U.S. Cl. ............................... 717/11; 717/5; 712/32
(58) Field of Search ....................... 717/11, 5, 6; 712/32, 712/23

(56) References Cited

U.S. PATENT DOCUMENTS

| | | | |
|---|---|---|---|
| 5,748,978 | * | 5/1998 | Narayan ................................. 712/23 |
| 5,794,063 | * | 8/1998 | Favor ..................................... 712/23 |
| 5,862,370 | * | 1/1999 | Dockser ................................. 712/226 |
| 5,884,058 | * | 3/1999 | Narayan ................................. 712/214 |
| 6,049,672 | * | 4/2000 | Shiell .................................... 717/11 |
| 6,135,651 | * | 10/2000 | Leinfelder ............................ 717/11 |
| 6,141,740 | * | 10/2000 | Mahalingaiah ...................... 711/215 |
| 6,230,258 | * | 5/2001 | Takayama ............................. 712/226 |

* cited by examiner

*Primary Examiner*—Eric Coleman
(74) *Attorney, Agent, or Firm*—Anthony V. S. England; Bracewell & Patterson, L.L.P.

(57) ABSTRACT

A "soft-patch" allows an instruction or group of instructions to be replaced with a pre-loaded instruction or group of instructions. When an Instruction Fetch Unit (IFU) fetches an instruction, the instruction is sent through a Compare and Mask (CAM) circuit which masks and compares, in parallel, the instruction with up to eight pre-defined masks and values. The masks and values are pre-loaded by a service processor to CAM circuits which are located in an Instruction Dispatch Unit (IDU) and the IFU in the central processor. An instruction that is deemed a match, is tagged by the IFU as a "soft-microcode" instruction. When the IDU receives the soft-microcode instruction for decoding, it detects the soft microcode marking and sends the marked instruction to a soft-microcode unit; a separate parallel pipeline in the IDU. The soft-microcode unit then sends the instruction through a CAM circuit which returns an index (or address) for RAM. The index is used to read values out of IDU RAM and generate replacement instructions. Additionally, an Internal Operation that will cause the processor core to perform an unconditional branch to a fixed real address, can be loaded into the IDU RAM allowing an instruction to be replaced by a subroutine or handler routine contained outside the processor core.

30 Claims, 4 Drawing Sheets

METHOD AND APPARATUS FOR MODIFYING INSTRUCTION OPERATIONS IN A PROCESSOR

BACKGROUND OF THE INVENTION

1. Technical Field

The present invention relates in general to data processing systems and in particular to a processor (processor) in a data processing system. More particularly, the present invention relates to instruction operations within the processor.

2. Description of the Related Art

Complex processors have very little room for performance errors and typically must operate with little or no processing errors. During initial design stages of a complex processor, it is probable that program instructions will have to be modified to improve operations that have a direct effect on performance. Additionally, performance errors may be found, in the field in program designs after a processor has been installed.

Many complex processors utilize a reduced instruction set computer ("RISC") core processor which is generally characterized by high throughput of instructions. RISC processors usually operate at a high clock frequency and because of the minimal instruction set do so very efficiently. In addition to high clock speed, processor efficiency is improved even more by the inclusion of multiple execution units allowing the execution of two, and sometimes more, instructions per clock cycle.

Processors with the ability to execute multiple instructions per clock cycle are described as "superscalar." Superscalar processors, such as the PowerPC™ family of processors available from IBM Corporation of Armonk, N.Y., provide simultaneous dispatch of multiple instructions. Included in the processor are an Instruction Cache ("IC"), an Instruction Dispatch Unit ("IDU"), an Execution Unit ("EU") and a Completion Unit ("CU"). Generally, a superscalar, RISC processor is "pipelined," meaning that a second instruction is waiting to enter the execution unit as soon as the previous instruction is finished. A typical RISC instruction set (PowerPC™) contains three broad categories of instructions: branch instructions (including specific branching instructions, system calls and Condition Register logical instructions); fixed point instructions and floating point instructions. Each group is executed by an appropriate function unit.

In a superscalar processor, instruction processing is usually accomplished in six stages—fetch, decode, dispatch, execute, completion and writeback stages. The fetch stage is primarily responsible for fetching instructions from an instruction cache and determining the address of the next instruction to be fetched. The decode stage generally handles all time-critical instruction decoding for instructions in an instruction buffer. The dispatch stage is responsible for non-time-critical decoding of instructions supplied by the decode stage and for determining which of the instructions can be dispatched in the current cycle.

The execute stage executes the instruction selected in the dispatch stage, which may come from the reservation stations or from instructions arriving from dispatch. The completion stage maintains the correct architectural machine state by considering instructions residing in a completion buffer and utilizes information about the status of instructions provided by the execute stage. The write back stage is used to write back any information from rename buffers that is not written back by the completion stage.

Complex processors, in this instance utilizing a RISC core, must perform with little or no margin for error. Instructions must be transformed into one or more internal operations (read hardware instructions) in the Instruction Decode Unit. At different stages between initial design and field experience, originally designed instruction operations in the processor may be changed because of unforeseen problems. Generally, the process requires a determination of the operation(s) that needs to be modified, a redesign of the hardware instructions and a reprogram of the processor. If errors are found in the field, the modification of the system is much more expensive in time and money. Generally, the processor must be changed out and any required support devices must be reprogrammed or changed out, contributing to an unnecessary expense in time and money. Furthermore, any advances made in the chip firmware currently requires that the chip be replaced.

It would be desirable therefore, to provide a method and apparatus that would allow for substituting instruction operations, both in the field and in the design stage, that would optimize performance and flexibility of a processor. It would also be desirable to provide a mechanism that would recognize incorrect instructions and enable correction of the instructions.

SUMMARY OF THE INVENTION

It is therefore one object of the present invention to provide a method and apparatus that will modify incorrect instructions in a processor.

It is another object of the present invention to provide a method and apparatus that will identify instructions in a processor that require modification.

It is yet another object of the present invention to provide a method and apparatus that will modify hardwired code in a processor.

The foregoing objects are achieved as is now described. A "soft-patch" allows an instruction or group of instructions to be replaced with a pre-loaded instruction or group of instructions. When an Instruction Fetch Unit (IFU) fetches an instruction, the instruction is sent through a Compare and Mask (CAM) circuit which masks and compares, in parallel, the instruction with up to eight pre-defined masks and values. The masks and values are pre-loaded by a service processor to CAM circuits which are located in an Instruction Dispatch Unit (IDU) and the IFU in the central processor. An instruction that is deemed a match, is tagged by the IFU as a "soft-microcode" instruction. When the IDU receives the soft-microcode instruction for decoding, it detects the soft microcode marking and sends the marked instruction to a soft-microcode unit; a separate parallel pipeline in the IDU. The soft-microcode unit then sends the instruction through a CAM circuit which returns an index (or address) for RAM. The index is used to read values out of IDU RAM and generate replacement instructions. Additionally, an Internal Operation that will cause the processor core to perform an unconditional branch to a fixed real address, can be loaded into the IDU RAM allowing an instruction to be replaced by a subroutine or handler routine contained outside the processor core.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
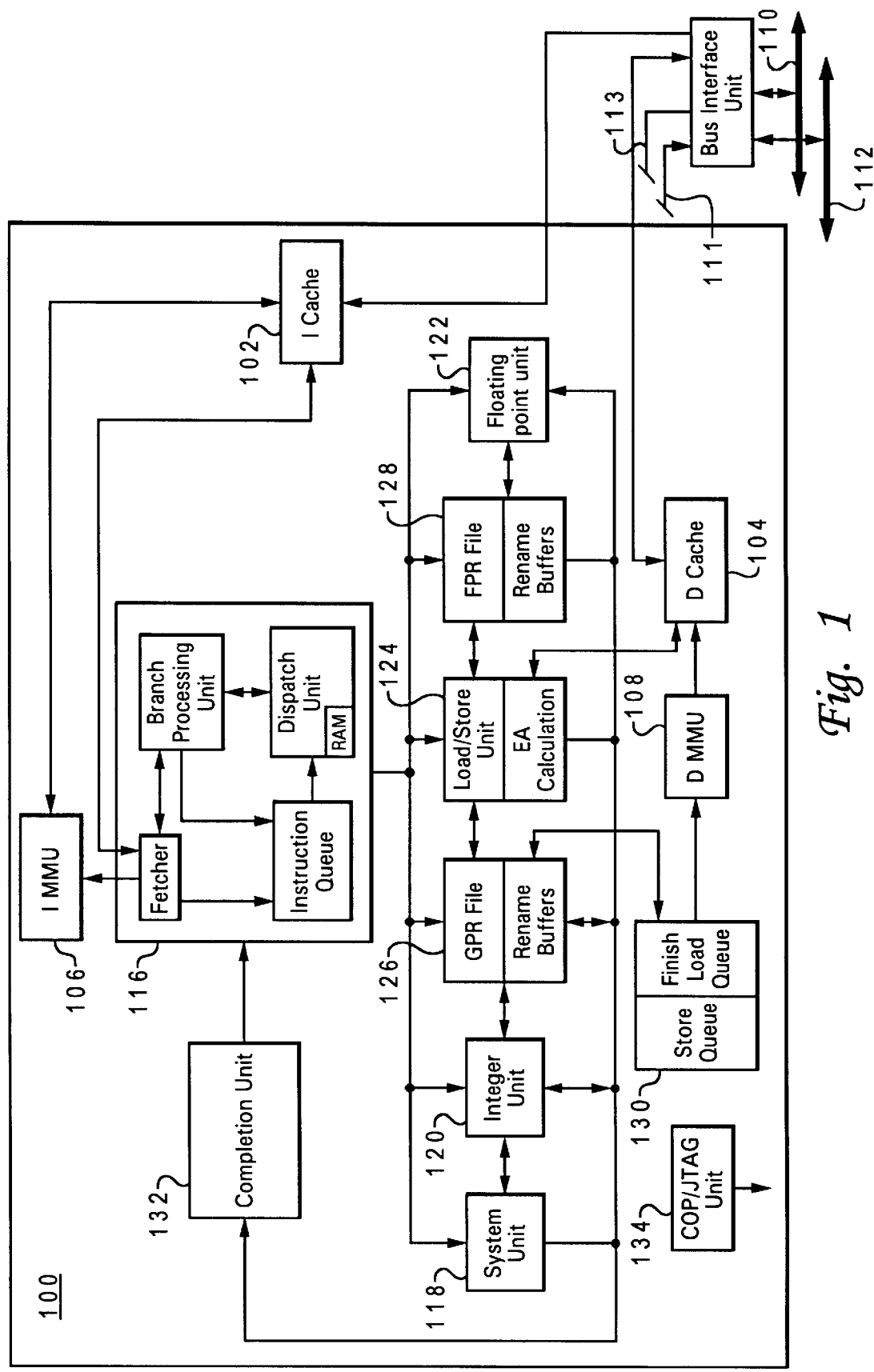
FIG. 1 depicts a block diagram of a core processor and related portions of a data processing system in which a preferred embodiment of the present invention may be implemented.

With reference now to the figures, and in particular with reference to FIG. 1, a block diagram of a processor core and related portions of a data processing system in which a preferred embodiment of the present invention may be implemented are depicted. Processor 100 is a single integrated circuit superscalar processor such as the PowerPC™ processor available from IBM Corporation of Armonk, N.Y. Accordingly, processor 100 includes various units, registers, buffers, memories, and other sections, all of which are formed by integrated circuitry. Processor 100 also operates according to reduced instruction set computing ("RISC") techniques.

Processor 100 includes level one (L1) instruction and data caches ("I Cache" and "D Cache") 102 and 104, respectively, each having an associated memory management unit ("I MMU" and "D MMU") 106 and 108. As shown in FIG. 1, processor 100 is connected to system address bus 110 and to system data bus 112 via bus interface unit 114. Bus interface unit 114 is also connected to a parallel and identical RISC processor core (not shown) via Data cache line 111 and Instruction cache line 113. Bus interface unit 114 shares both processor cores.

Instructions are retrieved from system memory (not shown) to processor 100 through bus interface unit 114 and are stored in instruction cache 102, while data retrieved through bus interface unit 114 is stored in data cache 104. Instructions are fetched as needed from instruction cache 102 by instruction unit 116, which includes instruction fetch logic, instruction branch prediction logic, an instruction queue and dispatch unit.

The dispatch unit within instruction unit 116, having a small on board Random Access Memory 117, dispatches instructions as appropriate to execution units such as system unit 118, integer unit 120, floating point unit 122, or load/store unit 124. System unit 118 executes condition register logical, special register transfer, and other system instructions. Integer or "fixed-point" unit 120 performs add, subtract, multiply, divide, shift or rotate operations on integers, retrieving operands from and storing results in integer or general purpose registers ("GPR File") 126. Floating point unit 122 performs single precision and/or double precision multiply/add operations, retrieving operands from and storing results in floating point registers ("FPR File") 128.

Load/store unit 124 loads instruction operands from data cache 104 into integer registers 126 or floating point registers 128 as needed, and stores instructions' results when available from integer or floating point registers 126 or 128 into data cache 104. Load and store queues 130 are utilized for these transfers from data cache 104 to and from integer or floating point registers 126 or 128. Completion unit 132, which includes reorder buffers, operates in conjunction with instruction unit 116 to support out-of-order instruction processing, and also operates in connection with rename buffers within integer and floating point registers 126 and 128 to avoid conflict for a specific register for instruction results. Common on-chip processor (COP) and joint test action group (JTAG) unit 134 provides a serial interface to the system for performing boundary scan interconnect tests.

The architecture depicted in FIG. 1 is provided solely for the purpose of illustrating and explaining the present invention, and is not meant to imply any architectural limitations. Those skilled in the art will recognize that many variations are possible. Processor 100 may include, for example, multiple integer and floating point execution units to increase processing throughput. All such variations are within the spirit and scope of the present invention.

Figure 2:
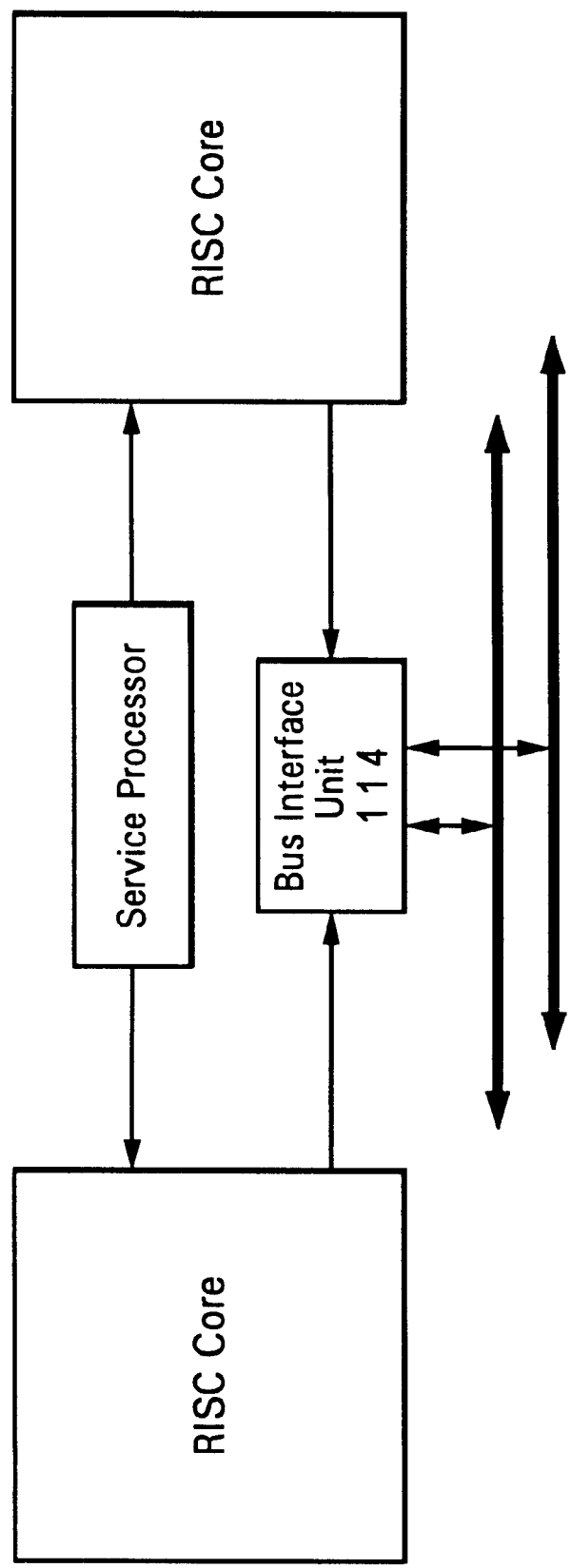
FIG. 2 is a high-level block diagram of a complex processor in accordance with a preferred embodiment of the present invention.

Referring to FIG. 2, a high-level block diagram of a complex processor in accordance with a preferred embodiment of the present invention, is illustrated. Complex processor 200 is comprised of two identical RISC superscalar processor cores 100 (as detailed in FIG. 1) and 202. As shown in FIG. 1, bus interface unit 114 connects, in parallel, the two processor cores 100 and 202 with system address bus 110 and system data bus 112. RISC Core 100 is connected and transfers data and instructions to buses 110 and 112 via data cache line 211 and instruction cache line 213. RISC Core 202 is connected to and transfers data and instructions to buses 110 and 112 via data cache line 111 and instruction cache line 113.

Service processor 206 is connected to RISC cores 100 and 202. Service processor 206 provides its own programming stream via an onboard Read Only memory. In the present invention, service processor 206 utilizes a programmable ROM (not shown) capable of receiving and storing data. Among other duties, service processor 206, in the present invention, is capable of initializing a soft microcode RAM in Instruction Dispatch Units (not shown) on board RISC cores 100 and 202. Further, in accordance with the present invention, service processor 206 is utilized to load masks and data to Compare and Mask (CAM) circuits (not shown) in Instruction Fetch Units and Instruction Dispatch Units on board RISC core 100 and 202. Replacement data can be loaded into service processor 206 memory so that service processor 206 may utilize CAMs on board RISC cores 100 and 202 to detect targeted instructions and provide replacement instructions automatically.

CAM circuits in the predecode block selectively match on a programmable subset of instruction bits and the matching criteria is as general or as restrictive as required. More than one match value can be implemented as well as allowing multiple soft patches to be implemented at a time. When a match occurs in this block, normally generated predecode bits are replaced by those that were stored along with the match entry. The replacement predecode bits indicate that the instruction is "soft patch microcode." Because more than one decode pipeline exists the decode routing utilizes the "replacement" predecode bits provided by the Predecode function. The new microcode sequence that replaces the soft patch microcode is loaded by the service processor at some time prior to the detection of the incorrect instruction and is comprised of IOPs that are directly supported by the processor core. One of the IOPs can be an operation that will result in the core unconditionally branching to an architected address (either on the processor or in external memory) which contains software routines that will replace the problem instructions.

Figure 3:
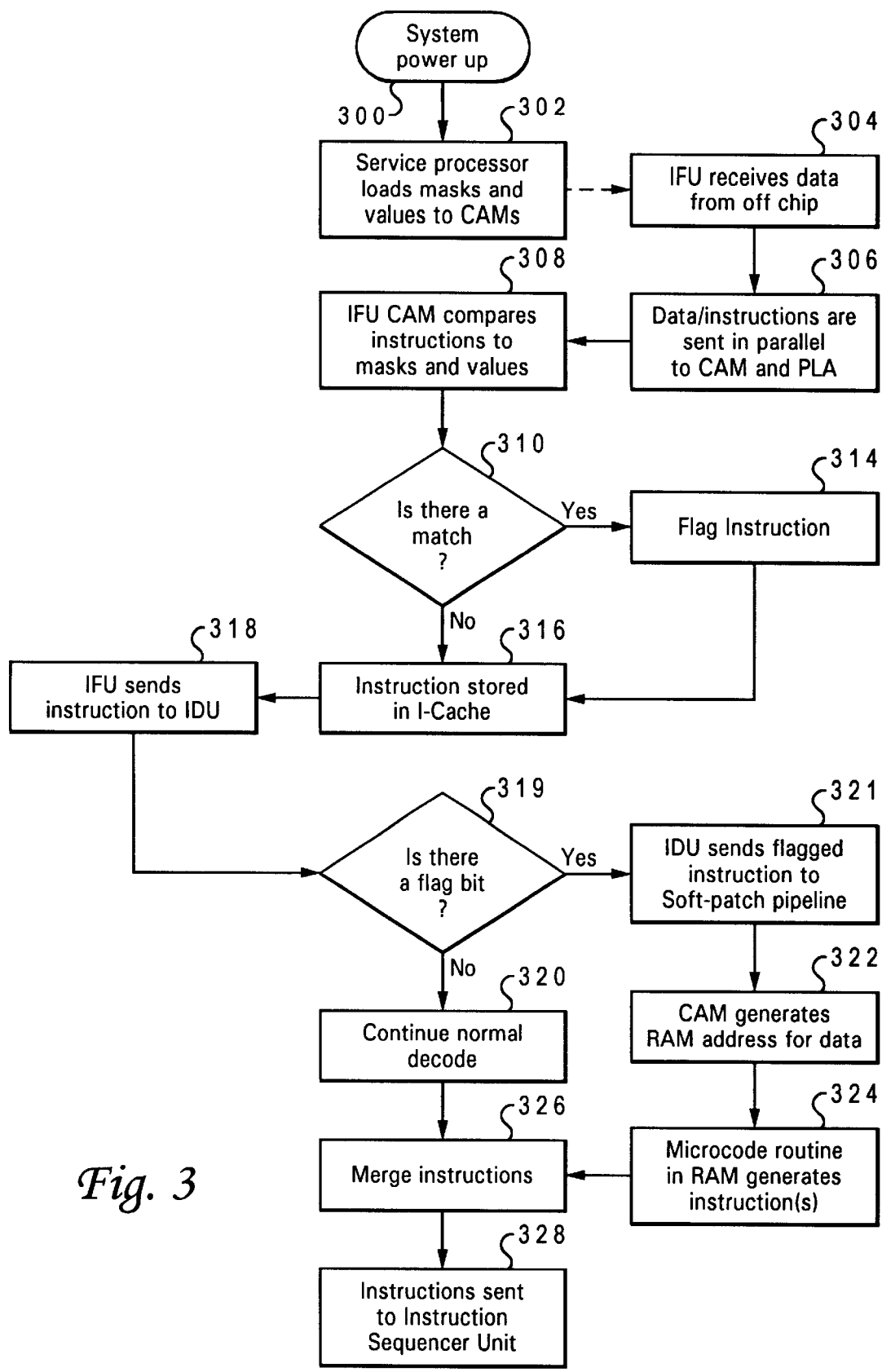
FIG. 3 depicts high-level flow diagram of a method for replacing or modifying instructions in accordance with a preferred embodiment of the present invention.

Referring now to FIG. 3, a high-level flow diagram of a method for replacing or correcting instructions in accordance with a preferred embodiment of the present invention, is depicted. The process begins with step 300, which depicts a system, utilizing the complex processor, powering up. The process proceeds to step 302, which illustrates a system service processor loading predetermined masks and predecode values, some time prior to use, to Compare and Mask (CAM) circuits on board a RISC processor core. During design or in the field, if a problem is detected in the original programming of the processor or an upgrade for improvement is desired, the present invention allows new data for changing instructions to be uploaded to CAM circuits to accomplish the change. As the service processor initializes the RISC cores (typically the SP services a pair of identical cores on a single chip) it initializes the IFU CAM and IDU RAM on board a RISC core with predetermined modification data (masks and predecode values).

The dotted line between step 302 and step 304 represents a period of time passing as step 304 does not immediately follow step 302 in time. The process passes from step 302 to step 304, which depicts the Instruction Fetcher Unit (IFU) in the RISC core processor fetching a group of instructions from off chip, typically from an L2 Cache. Next, the process proceeds to step 306, which illustrates instructions being sent in parallel to a CAM circuit and a Programmed Logic Array (PLA). The process continues with step 308, which depicts the IFU CAM comparing the received instructions with masks preloaded by the service processor (if no masks are loaded, there are no hits and the CAM instructions are the same as the PLA instructions).

The process next passes to step 310, which illustrates a determination of whether there is a match of the instruction with a mask in the IFU CAM circuit. If there is no match, the process proceeds to step 316, which depicts the instruction passing through the CAM circuit with no flag added and being stored in the I-Cache. Returning to step 310, if there is a match of the instruction with a mask, the process proceeds instead to step 314 which illustrates the IFU CAM circuit flagging the instruction that matches the preloaded data. The process then passes to step 316, which depicts the IFU CAM overriding the instruction in the PLA (literally replacing the PLA instruction) and the flagged instruction being stored in the instruction cache on board the RISC processor core. The process then proceeds to step 318, which illustrates the IFU sending the flagged instruction to the Instruction Dispatch Unit. The process continues to step 319, which depicts a determination of whether there is a flag bit with the instruction. If there is no flag bit, the process proceeds to step 320, which illustrates the IDU decoding the instruction in the normal fashion.

If there is a flag accompanying the instruction, the process proceeds instead to step 321, which depicts the IDU sending the flagged instruction to the soft-patch pipeline. Next the process passes to step 322, which illustrates the IDU CAM generating an address for data that may be used to generate an instruction or set of instructions. The process continues to step 324, which depicts a microcode routine in the RAM generating instructions determined by the flags and the preloaded data. An instruction, or group of instructions, may require multiple instructions to properly replace a targeted instruction or instructions. An instruction may be generated each clock cycle and the MUX enables the routine to generate the required number of replacement instructions. The process next proceeds to step 326, which illustrates sending the instructions into the regular stream of instructions for decoding. The process then continues to step 328, the instruction stream being sent to the Instruction Sequencer Unit (ISU).

TABLE 1

| INSTRUCTION | MASK | MATCH | INDEX |
| --- | --- | --- | --- |
| 1: | 12000010 | 12000010 | 01 |
| 2: | ffffffff | 12345600 | 03 |
| 3: | 00000000 | 00000001 | 00 |
| ETC. | | | |

The CAM in the IDU utilizes a table similar to the contents of TABLE 1 (Note that all values are in HEX). In order to generate a "hit," the functions become:

(instruction AND mask)=match.

If the above statement is true then a hit is generated. This permits the CAM to only hit on a specific instruction (i.e., instruction 2:) or on more general cases (for example instruction 1:—where only a few bits are actually checked). The mask defines which bits need to be compared.

Entry one is an example of checking only some of the flag bits. The flag has a group of zeroes with only the non-zero bits being checked. If the mask is all f's, or ones, then the check is for the instruction that matches that number, i.e., if the instruction is equal to 12345600, then there is a hit, if not then no hit. Entry three represents a non-soft patch mask wherein the match is an invalid instruction. If all entries (up to eight entries) in the CAM are equal to entry three, the soft patch is not in use and there would be no hits. In other words, the mask serves as a filter to determine whether an instruction is capable of being processed by the RISC processor. If not, a substitute sequence is generated.

The new microcode sequence, that replaces a soft patch microcode, is loaded by the service processor at some time prior to the detection of the incorrect instruction and is comprised of IOPs that are directly supported by the processor core. As stated earlier, one of the IOPs can be an operation that is inserted into volatile storage which, when executed by the processor core ISU, will cause the instruction stream to jump to a "Hardware Patch Vector" location. This location contains the software routines, (new microcode sequences) that will replace the targeted instructions.

Figure 4:
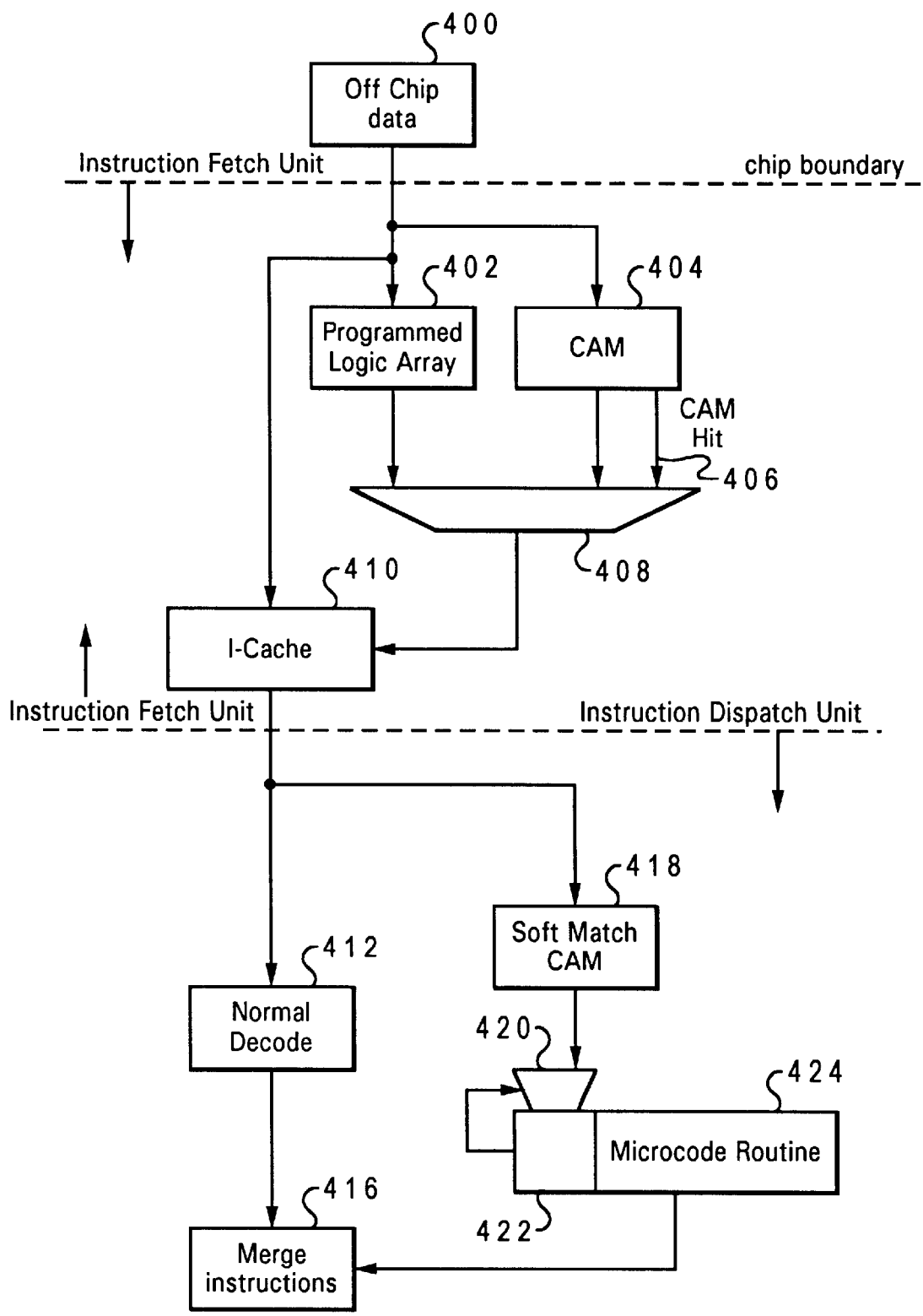
FIG. 4 is a high-level block diagram of data flow in an Instruction Fetch Unit and Instruction Dispatch Unit in one of an identical pair of RISC processor cores in accordance with a preferred embodiment of the present invention.

Referring now to FIG. 4, a high-level block diagram of data flow in an Instruction Fetch Unit and Instruction Dispatch Unit in one of an identical pair of RISC processor cores in accordance with a preferred embodiment of the present invention, is illustrated. Off chip data 400 represents data provided to the processor core by a service processor and Bus interface unit. On chip, in the Instruction Fetch Unit, Programmed Logic Array 402 receives the data in parallel with CAM 404. When special data and/or instructions are sent from the service processor, in accordance with the present invention, the data and instructions (for convenience referred to hereinafter as instructions) are accompanied by a flag, or status, bit. The instructions are compared in CAM 404 against masks that were preloaded by the service processor. If the instructions do not match with a preloaded mask (up to eight masks may be loaded) the instructions are transferred from PLA 402, as in a normal operation, to priority mux 408. If a match (hit) occurs, CAM 404 provides a flag for the instruction and through CAM hit 406 signals priority mux 408 that a hit occurred. CAM 404 then overrides PLA 402 and instructions and the attached flag is sent to priority mux 402 in place of non-flagged instructions from PLA 402.

The instruction(s), flagged or not, are then stored to the Instruction Cache 410. If the instructions are not flagged, the instructions are sent along a normal decode path through decode pipeline 412. The non-flagged instructions are transferred to a merge function 416 in the pipeline. If the instructions are flagged, the instructions are sent to a soft match CAM 418 within the Instruction Dispatch Unit. CAM 418 compares the flagged instruction to a preloaded mask again and if it matches, CAM 418 outputs an index into mux 420 for determining the address in RAM that contains data for generating new instructions. Since there may be more than one instruction generated as a replacement and only one instruction may be generated per clock cycle, mux 420 provides a feedback path for generating multiple instructions if needed. RAM 422 maintains a lookup table (not shown) containing data preloaded by the service processor and microcode routine 424 outputs the instructions from RAM 422. The new instructions are then sent to merge 416 with the normal instruction stream in order.

The present invention is capable of modifying microcode in the field or the development laboratory. For example, in the laboratory, if an experimental processor is fabricated and it is determined that there are problems with the hardwired microcode, the present invention may be utilized to replace faulty microcode to enable retrieval of more information on the problems with the processor. By substituting corrected instructions through the soft-patch, the processor could be debugged and would likely reveal more information than would ordinarily be available. In the field, if a processor is determined to be faulty for a particular function (rather than a catastrophic failure) a soft-patch containing problem correcting data may be uploaded to the processor. The present invention provides a low cost method and apparatus that will identify and modify faulty microcode in the laboratory and the field.

While the invention has been particularly shown and described with reference to a preferred embodiment, it will be understood by those skilled in the art that various changes in form and detail may be made therein without departing from the spirit and scope of the invention.

What is claimed is:

1. A method for providing replacement instructions in a pipelined processor, comprising the steps of:

loading predetermined values, a plurality of logical filter masks and a plurality of predefined flag bits;

loading predetermined data to a memory on board said processor;

fetching a plurality of instructions;

comparing each of said fetched instruction to at least one said logical filter mask;

marking each said fetched instruction that matches a said logical filter mask; and replacing said marked instruction with at least one replacement instruction.

2. The method of claim 1, further comprising:

accessing said predetermined data in an off-processor memory; and accessing a plurality of replacement instructions in said off-processor memory.

3. The method of claim 2, wherein loading said predefined flag bits to said Compare and Mask circuit, further comprises:

defining said flag bits as replacement instruction flag bits.

4. The method of claim 1, wherein loading a plurality of masks and values, further comprises:

loading said masks and values to a first Compare and Mask circuit in an Instruction Fetch Unit; and loading said masks and values to a second Compare and Mask circuit in an associated Instruction Dispatch Unit in the same processor core.

5. The method of claim 1, wherein loading said predetermined data to a memory, further comprises:

loading said data to a memory on the processor chip.

6. The method of claim 1, wherein comparing each said instruction to said logical masks, further comprises:

comparing said instructions and said logical masks in parallel, wherein said Compare and Mask circuit is capable of handling a plurality of masks and values.

7. The method of claim 1, wherein the step of marking a matching said fetched instruction, further comprises:

attaching appropriate flag bits to a matching instruction in a first Compare and Mask circuit;

storing said marked instruction in an Instruction Cache; and sending said marked instruction to a second Compare and Mask Circuit.

8. The method of claim 7, further comprising:

said second Compare and Mask circuit receiving said marked instruction;

said circuit returning an index from a table in said memory in Instruction Dispatch Unit.

9. The method of claim 8, further comprising:

utilizing said preloaded data; and generating a replacement instruction from said preloaded data.

10. The method of claim 9, further comprising:

replacing said marked instruction with said replacement instruction.

11. An apparatus for generating replacement instructions in a pipelined processor, comprising the steps of:

logic means for loading predetermined values, a plurality of logical masks and a plurality of predefined flag bits;

logic means for loading predetermined data to a memory on board said processor;

fetch means for fetching a plurality of instructions;

discriminating means for comparing each fetched instruction to at least one said logical mask;

tagging means for marking each said fetched instruction that matches a said logical mask; and replacement means for replacing said marked fetched instruction with at least one replacement instruction.

12. The apparatus of claim 11, further comprising:

means for accessing said predetermined data in an off-processor memory; and means for accessing said plurality of replacement instructions in said off-processor memory.

13. The apparatus of claim 12, wherein means for loading said predefined flag bits to said Compare and Mask circuit, further comprises:

means for interpreting said flag bits as replacement instruction flag bits.

14. The apparatus of claim 11, wherein means for loading a plurality of masks and values, further comprises:

means for loading said masks and values to a first Compare and Mask circuit in an Instruction Fetch Unit; and means for loading said masks and values to a second Compare and Mask circuit in an associated Instruction Dispatch Unit in the same processor core.

15. The apparatus of claim 11, wherein loading said predetermined data to a memory, further comprises:
   means for loading said data to a memory on the processor.

16. The apparatus of claim 11, wherein logic means for comparing each said fetched instruction to said logical masks, further comprises:
   logic means for comparing said instructions and logical masks in parallel, wherein said Compare and Mask circuit is capable of handling a plurality of masks and values.

17. The apparatus of claim 11, wherein means for marking a matching said fetched instruction, further comprises:
   means for attaching appropriate flag bits to a matching instruction in a first Compare and Mask circuit;
   storage means for storing said marked instruction in an Instruction Cache; and
   transmitting means for sending said marked instruction to a second Compare and Mask Circuit.

18. The apparatus of claim 17, further comprising:
   means for said second Compare and Mask circuit receiving said marked instruction;
   means for said second compare and Mask circuit returning an index from a table in said memory in Instruction Dispatch unit.

19. The apparatus of claim 18, further comprising:
   logic means for utilizing preloaded data; and
   logic means for generating a replacement instruction from said preloaded data.

20. The apparatus of claim 19, further comprising:
   means for replacing said marked instruction with said replacement instruction.

21. A computer programmable product within a computer readable medium for generating replacement instructions in a pipelined processor, comprising:
   instructions within said computer readable medium for loading predetermined values, a plurality of logical masks and a plurality of predefined flag bits;
   instructions within said computer readable medium for loading predetermined data to a memory;
   instructions within said computer readable medium for fetching a plurality of instructions;
   instructions within said computer readable medium for comparing each fetched instruction to at least one said logical mask;
   instructions within said computer readable medium for marking each said fetched instruction that matches a said logical mask; and
   instructions within said computer readable medium for replacing said marked instruction with at least one replacement instruction.

22. The computer program product of claim 21, further comprising:
   instructions within said computer readable medium for accessing predetermined data in an off-processor memory; and
   instructions within said computer readable medium for accessing a plurality of replacement instructions in said off-processor memory.

23. The computer program product of claim 22, wherein loading said predefined flag bits to said Compare and Mask circuit, further comprises:
   instructions within said computer readable medium for defining said flag bits as replacement instruction flag bits.

24. The computer program product of claim 21, wherein loading a plurality of masks and values, further comprises:
   instructions within said computer readable medium for loading said masks and values to a first Compare and Mask circuit in an Instruction Fetch Unit; and
   instructions within said computer readable medium for loading said masks and values to a second Compare and Mask circuit in an associated Instruction Dispatch Unit in the same processor core.

25. The computer program product of claim 21, wherein loading said predetermined data to a memory, further comprises:
   instructions within said computer readable medium for loading said data to a memory on the processor chip.

26. The computer program product of claim 21, wherein comparing each said instruction to said logical masks, further comprises:
   instructions within said computer readable medium for comparing said instructions and said logical masks in parallel, wherein said Compare and Mask circuit is capable of handling a plurality of masks and values.

27. The computer program product of claim 21, wherein the step of marking a matching said fetched instruction, further comprises:
   instructions within said computer readable medium for attaching appropriate flag bits to a matching instruction in a first Compare and Mask circuit;
   instructions within said computer readable medium for storing said marked instruction in an Instruction Cache; and
   instructions within said computer readable medium for sending said marked instruction to a second Compare and Mask Circuit.

28. The computer program product of claim 27, further comprising:
   instructions within said computer readable medium for said second Compare and Mask circuit receiving said marked instruction;
   instructions within said computer readable medium for said circuit returning an index from a table in said memory in Instruction Dispatch Unit.

29. The computer program product of claim 28, further comprising:
   instructions within said computer readable medium for utilizing preloaded data; and
   instructions within said computer readable medium for generating at least one replacement instruction from said preloaded data.

30. The computer program product of claim 29, further comprising:
   instructions within said computer readable medium for replacing said marked instruction with said replacement instruction.

* * * * *